(12) United States Patent
Tamayo-Rios

(10) Patent No.: US 9,313,028 B2
(45) Date of Patent: Apr. 12, 2016

(54) METHOD FOR FULLY HOMOMORPHIC ENCRYPTION USING MULTIVARIATE CRYPTOGRAPHY

(71) Applicant: Kryptnostic, Seattle, WA (US)

(72) Inventor: Matthew Tamayo-Rios, Menlo Park, CA (US)

( * ) Notice: Subject to any disclaimer, the term of this patent is extended or adjusted under 35 U.S.C. 154(b) by 53 days.

(21) Appl. No.: 13/915,500

(22) Filed: Jun. 11, 2013

(65) Prior Publication Data

US 2013/0329883 A1    Dec. 12, 2013

Related U.S. Application Data

(60) Provisional application No. 61/658,502, filed on Jun. 12, 2012.

(51) Int. Cl.
G06F 21/00 (2013.01)
H04L 9/28 (2006.01)
H04L 9/00 (2006.01)

(52) U.S. Cl.
CPC . H04L 9/28 (2013.01); H04L 9/008 (2013.01)

(58) Field of Classification Search
CPC .................................. H04L 9/28; H04L 9/008
USPC ............................................................ 380/28
See application file for complete search history.

(56) References Cited

U.S. PATENT DOCUMENTS

| | | | |
|---|---|---|---|
| 6,385,329 B1 * | 5/2002 | Sharma et al. | 382/100 |
| 8,515,058 B1 * | 8/2013 | Gentry | 380/28 |
| 8,762,736 B1 * | 6/2014 | Goldwasser et al. | 713/189 |
| 2010/0218037 A1 * | 8/2010 | Swartz et al. | 714/6 |
| 2011/0243320 A1 * | 10/2011 | Halevi et al. | 380/30 |
| 2012/0039463 A1 * | 2/2012 | Gentry et al. | 380/28 |
| 2013/0097431 A1 * | 4/2013 | Hriljac | 713/189 |

* cited by examiner

*Primary Examiner* — Jeffrey Pwu
*Assistant Examiner* — William Corum, Jr.
(74) *Attorney, Agent, or Firm* — Dergosits & Noah LLP; Todd A. Noah

(57) ABSTRACT

Embodiments are described for a method of performing fully homomorphic encryption on a data set by providing a multivariate encryption polynomial to produce an encrypted data set and a multivariate decryption polynomial to decrypt the encrypted data set, providing a multivariate function polynomial that represents an operation to be performed on the encrypted data set, and recomposing the function polynomial with encryption polynomial. Also described are a method comprising providing a private key comprising a multivariate polynomial polynomial function to encrypt plaintext data to produce ciphertext, and providing a public key comprising a multivariate set of equations derived from the private key and a randomly selected injective vectorial multivariate function to decrypt the ciphertext.

19 Claims, 7 Drawing Sheets

METHOD FOR FULLY HOMOMORPHIC ENCRYPTION USING MULTIVARIATE CRYPTOGRAPHY

CROSS-REFERENCE TO RELATED APPLICATIONS

The present application claims the benefit of the U.S. Provisional Application No. 61/658,502 entitled "Efficient Fully Homomorphic Encryption on Arbitrary Boolean Circuits," and filed on Jun. 12, 2012.

BACKGROUND

Homomorphic encryption has long been a subject of great interest in the field of cryptography due to its potential applications in cloud computing for outsourcing analysis and hosting of private data. Homomorphic encryption generally refers to encryption that allows functions to be performed on ciphertext to obtain an encrypted result. When decrypted, the result matches the result of the same functions performed on the plaintext. This allows a person to encrypt data and have functions (e.g., data mining operations) performed on the data by a third party, without that third party being able to perceive the data. Fully homomorphic encryption supports both addition and multiplication operations, and thus preserves the ring structure of the plaintext. Under this scheme, any circuit can be homomorphically evaluated, allowing the construction of programs that may be run on encryptions of their inputs to produce an encryption of their output. Since such a program never decrypts its input, the inputs and the internal state of the data is never exposed, and cannot be perceived by a third party.

The first fully homomorphic encryption scheme using lattice-based cryptography was shown by Craig Gentry of IBM in mid-2009. Gentry's method was based on the accumulation of an error vector, which is corrected for by 'homomorphically' decrypting the data and squashing the error. This method thus requires and introduces ciphertext expansion and error squashing operations. At present, deployment of the Gentry homomorphic encryption system is not practical because of the excessive time and processor resources required. For example, using non-homomorphic analysis on a 256-bit AES (Advanced Encryption Standard) block takes on the order of milliseconds using present computer systems, but upwards of 36 hours when performed using the Gentry homomorphic encryption method. This is clearly an unacceptable amount of time and processing overhead for most, if not all practical applications at present.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF EMBODIMENTS

Embodiments include a method of performing fully homomorphic encryption on a data set by providing a multivariate encryption polynomial to produce an encrypted data set and a multivariate decryption polynomial to decrypt the encrypted data set, providing a multivariate function polynomial that represents an operation to be performed on the encrypted data set, and recomposing the function polynomial with encryption polynomial. The function polynomial comprises a ciphertext representation of the data set. The method further comprises distributing the encryption polynomial and the function polynomial to a user publicly, and distributing the decryption polynomial to the user privately. At least one of the encryption polynomial and the decryption polynomial is an algebraic normal form equation, and the algebraic normal form comprises a non-linear Boolean circuit consisting of a set of Boolean functions. The Boolean circuit comprises a left inverse function.

In an embodiment, the multivariate decryption polynomial comprises a private key consisting of a plurality of matrices and a vectorial multivariate polynomial function, and wherein the multivariate encryption polynomial comprises a public key derived from the private key and a randomly selected injective vectorial multivariate function. The method may further comprise orthogonally embedding information required for decryption in the ciphertext and the multivariate encryption polynomial. The injective vectorial multivariate equation comprises a randomly chosen multivariate quadratic function, and wherein a nullspace of the quadratic function is trivial. The ciphertext may comprise a noised ciphertext space, and the method may further comprise adding noise to the data set, the noise comprising randomly selected plaintext noise and ciphertext noise, and removing the noise from the data set by mapping data set values to a lower dimensional space. The method may provide an obfuscation function that hides parameters of an encryption function generating the encrypted data, the obfuscation function selecting random bits of an output set comprising the encrypted data set, and wherein the random bits are ignored by a decryption function decrypting the encrypted data.

Embodiments are also directed to a method of performing fully homomorphic encryption on a data set, comprising providing an algebraic representation of a public encryption key that encrypts the data set, providing an algebraic representation of a private decryption key that decrypts the data set, providing an algebraic representation of a function to be executed on the data, and orthogonally embedding information required for decryption of the data set encryption key. The private decryption key comprises a plurality of matrices and a vectorial multivariate polynomial function, and the public encryption key is derived from the private decryption key and a randomly selected injective vectorial multivariate function. The selected injective vectorial multivariate function comprises orthogonally embedding information required for decryption of the data set, and the injective vectorial multivariate equation comprises a randomly chosen multivariate quadratic function, and wherein a nullspace of the quadratic function is trivial.

Embodiments are further directed to a method of performing fully homomorphic encryption on a data set by providing a private key comprising a multivariate polynomial polynomial function to encrypt plaintext data to produce ciphertext, and providing a public key comprising a multivariate set of equations derived from the private key and a randomly selected injective vectorial multivariate function to decrypt the ciphertext. This method may further comprise encrypting a first plaintext data set to generate a first ciphertext, encrypting a second plaintext data set to generate a second ciphertext, and comparing the first and second ciphertexts to determine equivalence. Such a method enables the determination of whether a numerical representation of the first ciphertext is greater than or less than the second ciphertext. Such a method also enables a function such as binary search, sorting, and hashtable generation over multiple ciphertext blocks of at least one of the first ciphertext and the second ciphertext. Such a method also enables representing null terminated string and common string operations.

Embodiments are further directed to circuits and systems that implement the above-described methods, as well as computer-readable media that store instructions implementing the above-described methods.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
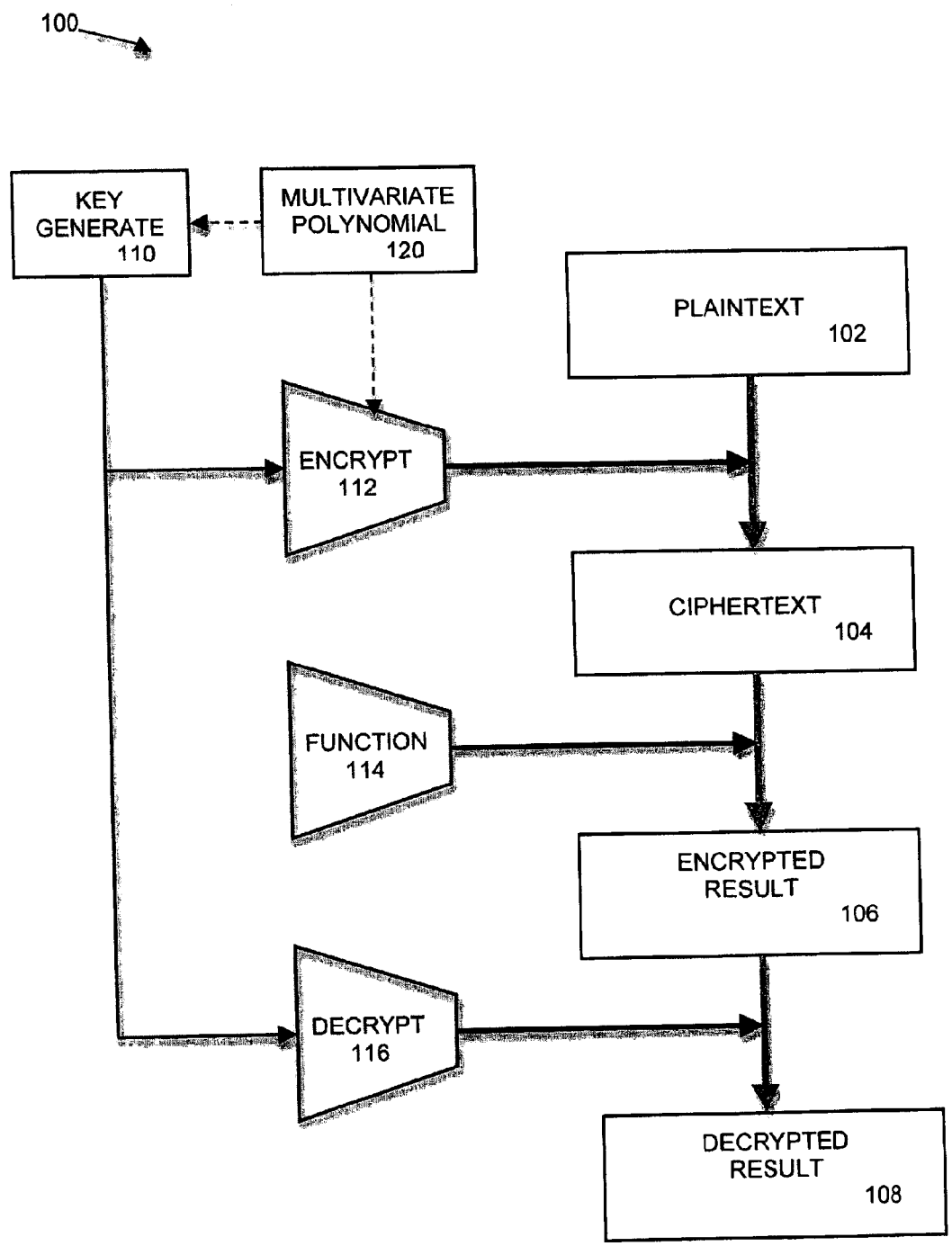
FIG. 1 is a block diagram of an embodiment of a homomorphic encryption process that utilizes multivariate encryption polynomials, under an embodiment.

Embodiments are described for a fully homomorphic encryption method that directly constructs an algebraic representation of the homomorphic circuit in terms of the ciphertext. Such a method includes a process for building left invertible circuits and their generalized left inverse over polynomial rings. Embodiments are further described for a multivariate cryptographic scheme that enables fully homomorphic evaluations of arbitrary Boolean circuits through their algebraic normal form representation as systems of multivariate polynomial equations. Such methods are used in a private key/public key encryption system that supports symmetric and asymmetric modes of data encryption to implement cryptosystems to enable scenarios such as sending encrypted e-mail messages that are searchable while still in the cloud, data mining of private databases, or outsourcing of sensitive operations without sacrificing security. Embodiments take advantage of the fact that Boolean functions and boolean circuits in the form of systems of algebraic normal functions can be efficiently evaluated on modern processors by a generalization of certain algorithms and even more efficiently evaluated with highly parallelized GPU (graphic processing unit) algorithms.

Aspects of the one or more embodiments described herein may be implemented in a computer system that processes data. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

DEFINITIONS AND NOTATIONS

For purposes of description, certain definitions and nomenclature are adopted as described herein to facilitate discussion. The set $\{0,1\}$ is denoted as $Z_2$. By definition B is just the equivalence classes of $Z_2$, but the latter is preferred because representation of Boolean circuits is more natural in $Z_2$. The powerset of a set S is the set of all subsets including the emptyset is denoted P(S).

Vectors are denoted by lowercase bold letters such as a, m, or x. Matrices are identified by uppercase bold letters such as C or D. The description uses a variant of the conventional indexing $x_i=(x_{i,j})$, where $x_{i,j}$ is the jth element of $x_i$. Similarly, for matrices $C=(C_{i,j})$, where $C_i$ is the ith row vector of C and $C_{i,j}$ is the jth entry of the ith row vector of C. The capitalization serves to distinguish between indexing into a set of vectors or indexing into a matrix. If $C=[x_1 \, x_2 \, \ldots \, x_n]$ then $x_i$ are understood to be the column vectors of C. row vectors are represented by $C=[x_1 \, x_2 \ldots x_n]^T$, where $^T$ denotes the transpose. An n dimensional vector x, with entries in $\mathbb{F}_2$, is noted by $x \in \mathbb{F}_2^n$. An n×m matrix C, with entries in $\mathbb{F}_2$, is noted by $\mathbb{F}_2^{n \times m}$. Indexing individual elements is done by using commas to make clear the separation between indexes. This notation is more verbose, but clearer in cases where index variables and numbers are mixed. Examples of indexing into vectors is given below.

$$a = \begin{bmatrix} a_1 \\ a_2 \\ \vdots \\ a_n \end{bmatrix} \quad m_i = \begin{bmatrix} m_{i,1} \\ m_{i,2} \\ \vdots \\ m_{i,k} \end{bmatrix} \quad x_i = \begin{bmatrix} x_{i,1} \\ x_{i,2} \\ \vdots \\ x_{i,k} \end{bmatrix} \quad (1)$$

The n×n identity matrix is denoted by I[n]. The truncated n×n identity matrix is denoted by $I[n; a, b] \in \mathbb{F}_2^{(b-a+1) \times n}$, with a<b and rows a through b preserved and the rest discarded.

$$I[n; 2, 3] = \begin{bmatrix} 0 & 1 & 0 & 0 \\ 0 & 0 & 1 & 0 \end{bmatrix} \quad (2)$$

The zero vector is denoted in $\mathbb{F}_2^n$ as $0^n$ and the zero matrix in $\mathbb{F}_2^{n \times m}$ as $0^{n \times m}$. Polynomial vectors of order one monomials in lexicographical order are often used for convenience in describing multivariate functions. Let $\mathcal{F}(x_1, x_2, \ldots, x_n) \in \mathbb{F}_2[x_1, X_2, \ldots, X_n]^m$ be a multivariate polynomial expression representing a function $\mathcal{F} : \mathbb{F}_2^n \to \mathbb{F}_2^m$ with n inputs and m outputs and let $x \in \mathbb{F}_2[X_1, X_2, \text{dots}, X_n]^n$ be polynomial vector of order one monomials in lexicographical order. With $x_i = x_i$, the expression $\mathcal{F}(x)$ is equivalent to writing $\mathcal{F}(x_1, x_2, \ldots, x_n)$.

A generalized inverse or g-inverse of a matrix A, is a matrix $A^+$ that has some of the properties of to the inverse matrix $A^{-1}$. There are many kinds of generalized inverses, but for purposes of description only two specific types of one-sided generalized inverses are relevant. The definitions below are restricted to matrices over fields, but the definitions extend to arbitrary commutative rings. The left generalized inverse of $A \in \mathbb{F}_q^{r \times c}$, $A^+$ satisfies the following properties: 1. $c > r$ and 2. $A^+A = I_c$. The right generalized inverse of $A \in \mathbb{F}_q^{r \times c}$, $A^+$ satisfies the following properties: 1. $r > c$ and 2. $AA^+ = I_r$. When $c = r$, this gives the standard definition of a matrix inverse. An important distinction between the inverse and generalized inverses is that the generalized inverse of a matrix is not necessarily unique.

The algebraic normal form (ANF) is a canonical way of representing boolean functions. A boolean function $f$ is considered to be expressed in ANF, if and only if (iff) it is expressed entirely as the sum (XOR) of a constant and products (AND) of function arguments. Furthermore, each boolean function has a unique representation in ANF. The general form of the ANF for a boolean function can be succinctly expressed as $$f(x) = f(x_1, x_2, \ldots, x_n) = \sum_{i \in \mathcal{P}(\{1,2,\ldots,n\})} a_i \prod_{j \in i} x_j \quad (3)$$

In other words ANF form is canonical form for representing boolean functions in terms of elements from the ring of polynomials $\mathbb{F}_2[x_1, x_2, \ldots x_n]^n$. The general ANF for a function $f$ of four boolean variables better elucidates the structure of an ANF representation:

$f(x_1, x_2, x_3, x_4) =$ $a_\emptyset +$ $a_1 x_1 + a_2 x_2 + a_3 x_3 + a_4 x_4 +$ $a_{1,2} x_1 x_2 + a_{1,3} x_1 x_3 + a_{1,4} x_1 x_4 +$ $a_{2,3} x_2 x_3 + a_{2,4} x_2 x_4 + a_{3,4} x_3 x_4 +$ $a_{1,2,3} x_1 x_2 x_3 + a_{1,2,4} x_1 x_2 x_4 + a_{1,3,4} x_1 x_3 x_4 +$ $a_{2,3,4} x_2 x_3 x_4 +$ $a_{1,2,3,4} x_1 x_2 x_3 x_4 \quad (4)$ Thus the representation of a Boolean function is a polynomial of n variables in the ring $\mathbb{F}_2[x_1, x_2, \ldots, x_n]$. All possible monomials on n function arguments form a set of linearly independent basis functions for all boolean functions of n variables.

Some monomial within a Boolean function is referred to as follows: $f: \mathbb{F}_2^n \to \mathbb{F}_2$, as $m \in f$. This means a term in the ANF representation of $f$, and not necessarily any specific term. Similarly, $m \in f(x)$ is meant to be a term in the ANF representation of $f$ expressed on the vector $x$ of order one monomials with $x \in \mathbb{F}_2[x_1, x_2, \ldots, x_n]^n$. The entries of vector $x$ should be understood in terms of default lexicographic ordering of order one monomials, $x_i = x_i$, with $x_i \in \mathbb{F}_2[x_1, x_2, \ldots, x_n]$. Order one monomials may also be referred to as variables. Similarly, if some individual variable $x_i$ appears in some monomial term $t \in f$, the notation $x_i \in m \in f$ is used. The existence of an individual variable is denoted within a monomial by $\exists x_i \in m \in f$. Finally, a variable $x_i$ that does not occur in any monomial in a function is notated as $x_i \notin m$, $\forall t \in f(x)$. It may occasionally be difficult to tell whether a vector is representing an element in $\mathbb{F}_2^n \subset \mathbb{F}_2[x_1, x_2, \ldots, x_n]^n$ or the full ring itself. In general, when an argument is provided during function compositions and function definitions it is intended to illustrate the polynomial description of that function. When it is ambiguous as to whether a vector is intended as a vector of order one polynomials or as vector constants (order zero polynomials) it will be explicitly noted.

Additional notation conventions are as follows. Let $\mathcal{F}: \mathbb{F}_2^n \to \mathbb{F}_2^m \in \mathbb{F}_2[x_1, x_2, \ldots, x_n]^m$ be a multivariate polynomial vector function, the following definitions apply for commonly defined operations and objects. The ordered set of monomials of a multivariate vector function $\mathcal{M}[\mathcal{F}]$ is the set of all monomials of $\mathcal{F}$, sorted by reverse lexicographical order. It will be frequently used as an index set. The coefficient matrix of $C[\mathcal{F}] \in \mathbb{F}_2^{m \times |\mathcal{M}[\mathcal{F}]|}$ of multivariate vector function $\mathcal{F}$ is the matrix of coefficients corresponding to all of its monomials. The linear and non-linear contributions to $\mathcal{F}$ are denoted by $L[\mathcal{F}]$ and $\overline{L}[\mathcal{F}]$, respectively. They satisfy the following constraints.

$\forall t \in L[\mathcal{F}], \deg t \leq 1$ $\forall t \in \overline{L}[\mathcal{F}], \deg t > 1$ $$L[\mathcal{F}] + \overline{L}[\mathcal{F}] = F \quad (5)$$

The nullspace of $\mathcal{F}$ is the set of all vectors in $n \in \mathbb{F}_2^m$ such that $n^T \mathcal{F} = \vec{0}$ and is denoted $\mathcal{N}[\mathcal{F}]$. The Gröbner basis of $\mathcal{F}$ is denoted $\mathcal{GB}(\mathcal{F})$. The ideal generated by $\mathcal{F}$ and its Gröbner basis $\mathcal{GB}(\mathcal{F})$ is denoted by $I[\mathcal{F}]$ or $I[\mathcal{GB}(\mathcal{F})]$, respectively.

Boolean Functions and Circuits

A Boolean function on n bits is a function $f: \mathbb{Z}_2^n \to \mathbb{Z}_2$ that maps n input variables to [0] or [1] in $\mathbb{Z}_2$. In other words a function that maps an n bit Boolean vector m to 1 output bit $(b = f(m))$. There are various ways of representing a Boolean function, such as but not limited to, algebraic normal form, conjunctive normal form, disjunctive normal form, canonical sum of products (and product of sums), and binary decision diagrams. For the purposes of description, the algebraic normal form of each Boolean function is preferred.

An m bit Boolean circuit $\mathcal{C}$ on n bits is a Boolean vector function consisting of a set of m Boolean functions:

$$\mathcal{F}(\mathcal{C}) = \{f_i: \mathbb{Z}_2^n \to \mathbb{Z}_2 | i \in \{1, 2, \ldots, m\}\} \quad (6)$$

That is the circuit $\mathcal{C}$ maps an n bit Boolean vector to an m bit Boolean vector.

$$C: \mathbb{Z}_2^n \to \mathbb{Z}_2^m \quad (7)$$

$$C(m) = \begin{bmatrix} f_1(m) \\ f_2(m) \\ \vdots \\ f_m(m) \end{bmatrix}$$

Sometimes it is useful to refer to some function within a circuit. For the purposes of notation $f \in \mathcal{C}$ is equivalent to saying $f \in \mathcal{F}(\mathcal{C})$. In other cases, it is useful to refer to each individual function using an index in a consistent fashion. As addressing a function by index is usually done when describing a function in terms of processing on the input bits, the ith function $f_i$ in a circuit is notated as $\mathcal{C}(m)_i$, where it can be described in terms its input m. The ith bit in Boolean circuit means $\mathcal{C}(m)_i$.

Circuits can be used as inputs to other circuits by viewing the operation as function composition. The composition of two Boolean circuits is still a Boolean circuit. A circuit of a Boolean circuit is still a Boolean circuit. Chaining two circuits $\mathcal{C}_1: \mathbb{Z}_2^n \to \mathbb{Z}_2^m$ and $\mathcal{C}_2: \mathcal{C}: \mathbb{Z}_2^m \to \mathbb{Z}_2^{m'}$ to form a third circuit $\mathcal{C}: \mathbb{Z}_2^n \to \mathbb{Z}_2^{m'}$ is the equivalent of function composition:

$$\mathcal{C}(m) = \mathcal{C}_2(\mathcal{C}_1(m)) \quad (8)$$

Mechanically speaking, the ANF representation in terms of monomials $m_i \in m$ of the circuit $\mathcal{C}_1$ is used as the input to the ANF representation of $\mathcal{C}_2$, resulting in a set of Boolean functions still in ANF for circuit $\mathcal{C}$ that are a direct morphism of the input m. It is worth noting that chaining a sequence of invertible Boolean functions together results in an invertible Boolean circuit $(\mathcal{C}_1^{-1}(\mathcal{C}_2^{-1}(\mathcal{C}^{-1}(\mathcal{C}(m))))=m)$. An example is provided below to better illustrate $\mathcal{C}(m)=\mathcal{C}_1(\mathcal{C}_2(m))$.

$$C1: \mathbb{Z}_2^3 \to \mathbb{Z}_2^4 \qquad (9)$$

$$C_1(m) = \begin{bmatrix} m_1 + m_3 + m_1 m_2 \\ m_2 + m_3 \\ m_3 + m_1 m_3 + m_2 m_3 \end{bmatrix}$$

$$C2: \mathbb{Z}_2^4 \to \mathbb{Z}_2^3 \qquad (10)$$

$$C_2(m) = \begin{bmatrix} m_3 + m_2 m_3 + m_1 m_3 \\ m_2 + m_1 m_3 \\ m_3 + m_1 m_2 \\ m_3 + m_1 m_3 \end{bmatrix}$$

$$C: \mathbb{Z}_2^3 \to \mathbb{Z}_2^4 \qquad (11)$$

$$C(m) = C_1(C_2(m)) =$$
$$(m_3 + m_1 m_3 + m_2 m_3) + (m_2 + m_3)(m_3 + m_1 m_3 + m_2 m_3) +$$
$$(m_1 + m_3 + m_1 m_2)(m_3 + m_1 m_3 + m_2 m_3)(m_2 + m_3) +$$
$$(m_1 + m_3 + m_1 m_2)(m_3 + m_1 m_3 + m_2 m_3)(m_3 + m_1 m_3 + m_2 m_3) +$$
$$(m_1 + m_3 + m_1 m_2)(m_2 + m_3)(m_3 + m_1 m_3 + m_2 m_3) +$$
$$(m_1 + m_3 + m_1 m_2)(m_3 + m_1 m_3 + m_2 m_3)$$

The process does not expand multiply out to canonical ANF, as the example above better illustrates the circuit composition process.

For a subring of a Boolean circuit, let $\mathcal{B}^n$ denote the set of all Boolean functions on n variables, $m \in \mathbb{Z}_2^n$, expressed in algebraic normal form.

$$\mathcal{B}^n = \Sigma_{i \in \mathcal{P}(I)} a_i \Pi_{j \in i} m_j | \forall a_i \in \mathbb{Z}_2, I = \{1, 2, \ldots, n\}\} \qquad (12)$$

The set $\mathcal{B}^n$, together with the multiplication and addition operators form a ring $(\mathcal{B}^n, *, +)$ of all possible Boolean functions. This is seen directly from the fact that the product or sum of any two ANF polynomials will be another ANF polynomial. Thus $\forall f_1, f_2 \in \mathcal{B}^n$ yields $f_1 f_2 \in \mathcal{B}^n$ and $f_1 + f_2 \in \mathcal{B}^n$ with $1 \in \mathcal{B}^n$ as the multiplicative identity. Associativity and commutativity of polynomial multiplication with coefficients in a commutative ring is well established and we do not repeat the proof here. It is worth noting that $|\mathcal{B}^n| = 2^{2^n}$. Each Boolean circuit $\mathcal{C}: \mathbb{Z}_2^n \to \mathbb{Z}_2^m$ generates a subring of $(\mathcal{B}^n, *, +)$ denoted $\langle\langle\mathcal{C}\rangle\rangle = (S, *, +)$, which is important for proving various points relating to the invertibility of Boolean circuits. The subset of Boolean functions $S \subseteq B^n$ generated from $\mathcal{C}$ is defined as follows:

$$S = \Sigma_{i \in \mathcal{P}(I)} a_i \Pi_{j \in i} \mathcal{C}(m)_j | \forall a_i \in \mathbb{Z}_2, I = \{1, 2, \ldots, m\}\} \qquad (13)$$

A circuit $\mathcal{C}: \mathbb{Z}_2^n \to \mathbb{Z}_2^n$ is said to be an invertible circuit iff $\mathcal{C}$ is a bijection between two Boolean vectors spaces. Determining whether a circuit is invertible and determining that actual inverse of a circuit are NP-hard, with the exception of some planar circuits. As a result cryptographers often prefer to use well understood and analyzed building blocks for cryptographic ciphers, where each individual block is invertible and chained together with other invertible blocks since the inverse of a series of invertible function compositions is just the corresponding inverses composed in reverse order. In addition this allows the selection of circuits for resistance against algebraic and differential attacks. In general, all invertible Boolean circuits are just linear maps, which are simply too large to effectively search or invert with current techniques.

This section provides a more precise mathematical formulation of what is meant by a "generalized inverse" of an arbitrary Boolean function. In terms of general function theory, there are two relevant types of inverses, i.e., left and right inverses.

The left inverse or retraction of a Boolean circuit $\mathcal{C}: \mathbb{Z}_2^n \to \mathbb{Z}_2^m$ is denoted by $\mathcal{C}^-$ and is a surjective function from the image to the domain of f such that $\mathcal{C}^-(\mathcal{C}(m)) = m$, $\forall m \in \mathbb{Z}_2^n$. A function has a left inverse if and only if it is injective. A right inverse or section of a Boolean circuit $\mathcal{C}: \mathbb{Z}_2^n \to \mathbb{Z}_2^m$ is a surjective function $\mathcal{C}^+$ from the image to the domain of $\mathcal{C}$ such that $\mathcal{C}(\mathcal{C}^+(x)) = x$, $\forall x \in \mathbb{Z}_2^m$. A function has a right inverse if and only if it is surjective. An inverse that is a both a left and right inverse must be unique, but there are no requirements that a left inverse also be a right inverse and vice-versa. For cryptographic applications, the focus will be on left inverses of Boolean circuits. A generalized right inverse would only serve to provide an alternate decryption circuit, something that is not likely to improve the security of a cryptosystem.

Boolean circuits have some useful properties that aid in describing criteria for invertibility. A dominant bit in a Boolean circuit is an input bit for which there exists a Boolean function in the subring generated by the circuit, where said function's output is always affected by the input bit regardless of the other values of the inputs bits in an input Boolean vector. If $\mathcal{C}: \mathbb{Z}_2^n \to \mathbb{Z}_2^m$ is a Boolean circuit with input $m \in \mathbb{Z}_2^n$, then input bit $m_i$ is said to be dominant if and only if $\exists f \in \langle\langle\mathcal{C}\rangle\rangle$ such that $$\frac{\partial f}{\partial m_i} \neq \vec{0} \qquad (14)$$

The motivation for this definition is that a function has a left inverse if and only if it is injective. If $\exists b \in \mathbb{Z}_2^n$ such that $\forall f \in \langle\langle\mathcal{C}\rangle\rangle$ $$\frac{\partial C(m)}{\partial m_i}(b) = \vec{0} \qquad (15)$$

In the above equation, $\exists b' = b$, except for $b_i = 1 + b_i$, such that $\mathcal{C}(b') = \mathcal{C}(b)$, implying that the function is surjective and cannot have a left inverse.

A retractable bit of a Boolean circuit $\mathcal{C}: \mathbb{Z}_2^n \to \mathbb{Z}_2^m$ is an input bit $m_i$ of input $m \in \mathbb{Z}_2^n$, such that $m_i \in \langle\langle\mathcal{C}\rangle\rangle$.

Fully Homomorphic Encryption on Arbitrary Circuits

Embodiments include a fully homomorphic cryptosystem, that supports asymmetric encryption. A short set of descriptions for the relevant spaces in describing the cryptosystem method, are as follows. Asymmetrically encryptable plaintext space is the set of all possible plaintext messages $m \in \mathbb{Z}_2^m$. This is the space the generator of the public key makes available for public use. Plaintext space is the set of all possible plaintext messages $m \in \mathbb{Z}_2^n$. Noised plaintext space is the message space extended such that $\rho$ of the elements are noise. The purpose of adding noise is to make the encryption more robust. It is the set of all possible Boolean vectors in $p \in \mathbb{Z}_2^\eta$, where $\eta = n + \rho$. Ciphertext space is the m dimensional Boolean vector space onto which messages are mapped from the extended plaintext space, where $m \geq \eta$. It is the set of all possible Boolean vectors in $x \in \mathbb{Z}_2^m$.

The public key system is thus fully parameterized in terms (n, n', $\rho$, m, $\psi$). Tweaking these parameters will affect the ciphertext expansion ratios $$\frac{m+\psi}{n} \text{ and } \frac{m+\psi}{n\prime}$$

for the plaintext space and the asymmetrically encryptable plaintext space respectively. In addition, security will be a function of the private key complexity, which itself is partially dependent on n, m, ρ, ψ, v.

Noised ciphertext space is the m+ψ space onto which ciphertexts are mapped from the extended ciphertext space. It is the set of all possible Boolean vectors in $\vec{x} \in \mathbb{Z}_2^{m+\psi}$. Noise functions are defined as follows: a plaintext noise circuit $\mathcal{N}_m: \mathbb{Z}_2^n \to \mathbb{Z}_2^n$, a ciphertext noise circuit $\mathcal{N}_x: \mathbb{Z}_2^m \to \mathbb{Z}_2^{m+\psi}$ and respective noise removal circuits $\mathcal{R}_m: \mathbb{Z}_2^\psi \to \mathbb{Z}_2^n$ and $\mathcal{R}_x: \mathbb{Z}_2^{m+\psi} \to \mathbb{Z}_2^m$ that remove noise. The functions $\mathcal{N}_m$ and $\mathcal{N}_x$ are randomly generated as needed and defined in terms of randomly generated index sets $I_m$, $I_x$ and randomly chosen permutation matrices $P_m$, $P_x$. The matrix $P_m$ representing is an ηη matrix representing a random permutation in $S_\eta$ and the $P_x$ is an (m+ψ)×(m+ψ) matrix representing a random permutation in $S_{m+\psi}$. The index sets are defined as follows $$I_m \subseteq \mathcal{P}(\{1, 2, \ldots, n\}) \quad (16)$$
$$I_x \subseteq \mathcal{P}(\{1, 2, \ldots, m\})$$

$$\mathcal{N}'_m(m)_i = \begin{cases} m_i & \text{if } i \le n \\ \sum_{j \in I_m} [\delta_{j,\varnothing} + \prod_{k \in j} m_k]] & \text{otherwise} \end{cases} \quad (17)$$

$$\mathcal{N}'_x(x)_i = \begin{cases} x_i & \text{if } i \le m \\ \sum_{j \in I_m} [\delta_{j,\varnothing} + \prod_{k \in j} x_k]] & \text{otherwise} \end{cases}$$

$$\mathcal{N}_m(m) = P_m \mathcal{N}'_m(m) \quad (18)$$

$$\mathcal{N}_x(x) = P_x \mathcal{N}'_x(x) \quad (19)$$

The functions $\mathcal{R}_m$ and $\mathcal{R}_x$ are much simpler and simply map values directly to a lower dimensional space, removing the noise.

$$\mathcal{R}'_m(p) = P_m^{-1} p \quad (20)$$

$$\mathcal{R}'_x(\vec{x}) = P_x^{-1} x \quad (21)$$

$$\mathcal{R}_m(p)_i = \mathcal{R}'_m(p)_i, \text{ for } i \le n \quad (22)$$

$$\mathcal{R}_x(\vec{x})_i = \mathcal{R}'_x(x)_i, \text{ for } i \le m \quad (23)$$

Once chosen the sets $\mathcal{J}_m$ and $\mathcal{J}_x$ must remain the same, unless the entire homomorphically encrypted data set is processed through a homomorphic noise index switching function, which is the function compositional equivalent of decrypting the data, extending the plaintext with a new noise function, encrypting it, and extending the encryption with a new noise function. This would be a very computationally expensive operation.

FIG. 1 is a block diagram of an embodiment of a homomorphic encryption process that utilizes multivariate encryption polynomials, under an embodiment. As shown in diagram 100 of FIG. 1, the basic homomorphic encryption process comprises encrypting plaintext data 102 through a homomorphic encryption operation 112. This produces ciphertext 104, which is the encrypted plaintext 102. A function 114 can be performed on the ciphertext 104 to produce an encrypted result 106. This result data can then be decrypted 116 to produce the decrypted result data 108. In an embodiment a public/key private key generation process 110 is used to produce the keys for the encryption 112 and decryption 116 operations. A multivariate polynomial function is used in conjunction with at least one of the key generation 110 and encryption 112 processes to implement a homomorphic encryption system that utilizes multivariate encryption polynomials.

Private Key Generation

Private key generation is a critical process of the cryptosystem from a security perspective. In an embodiment, the key generation process involves generating left invertible circuits. The private key P={$\mathcal{E}, \mathcal{D}$} consists of two circuits $\mathbb{Z}$: $\mathcal{E}_2^n \to \mathbb{Z}_2^m$ and $\mathcal{D}: \mathbb{Z}_2^m \to \mathbb{Z}_2^n$, where m≥η and $\mathcal{D}$ is $\mathcal{E}$'s left inverse $\mathcal{E} = \mathcal{D}^-$. The encryption circuit $\mathcal{E}$ should be chosen such that it does not preserve the zero vector.

The private key can be stored as its ANF representation, but for the purposes of keeping track of equivalence classes of the encryption circuit and for simplifying the generation of homomorphic circuits it is desirable to maintain the sequences of circuit functions $\mathcal{S}_i$ instead.

Up to this point we have only used a single encryption circuit $\mathcal{E}$ when describing the key generation for the cryptosystem. Considering that $\mathcal{D}$ is a left inverse of $\mathcal{E}$ leads to the question of whether $\mathcal{E}$ is the only possible right inverse of $\mathcal{D}$. The answer is that in general $\mathcal{E}$ is only one of many possible right inverses of $\mathcal{D}$ and that the decryption circuit's kernel defines a equivalence relation on the set of Boolean circuits with n variables and m outputs.

$$\mathcal{D}_1 \sim_D \mathcal{D}_2 \Leftarrow \mathcal{D}(\mathcal{D}_1(m)) = \mathcal{D}(\mathcal{E}_2(m)) \quad (24)$$

$$[\mathcal{E}] = \{\mathbb{Z}_1: \mathcal{E}_2^n \to \mathbb{Z}_2^m | \mathcal{E}_1 \sim_D \mathcal{E}\} \quad (25)$$

There are three ways to determine (parts of) the kernel of $\mathcal{D}$. One way is to keep track of equivalence classes during circuit generation and is described above. A second alternative is to attempt to directly find different sequences of functions $\mathcal{S}_i$ that inverts the circuit, but that computationally prohibitive. A preferred approach is to simply choose appropriate cryptosystem parameters such that the free dimensions allow for a large number of equivalent circuits ($0(2^{2^n})$ possible per free dimension).

Figure 2:
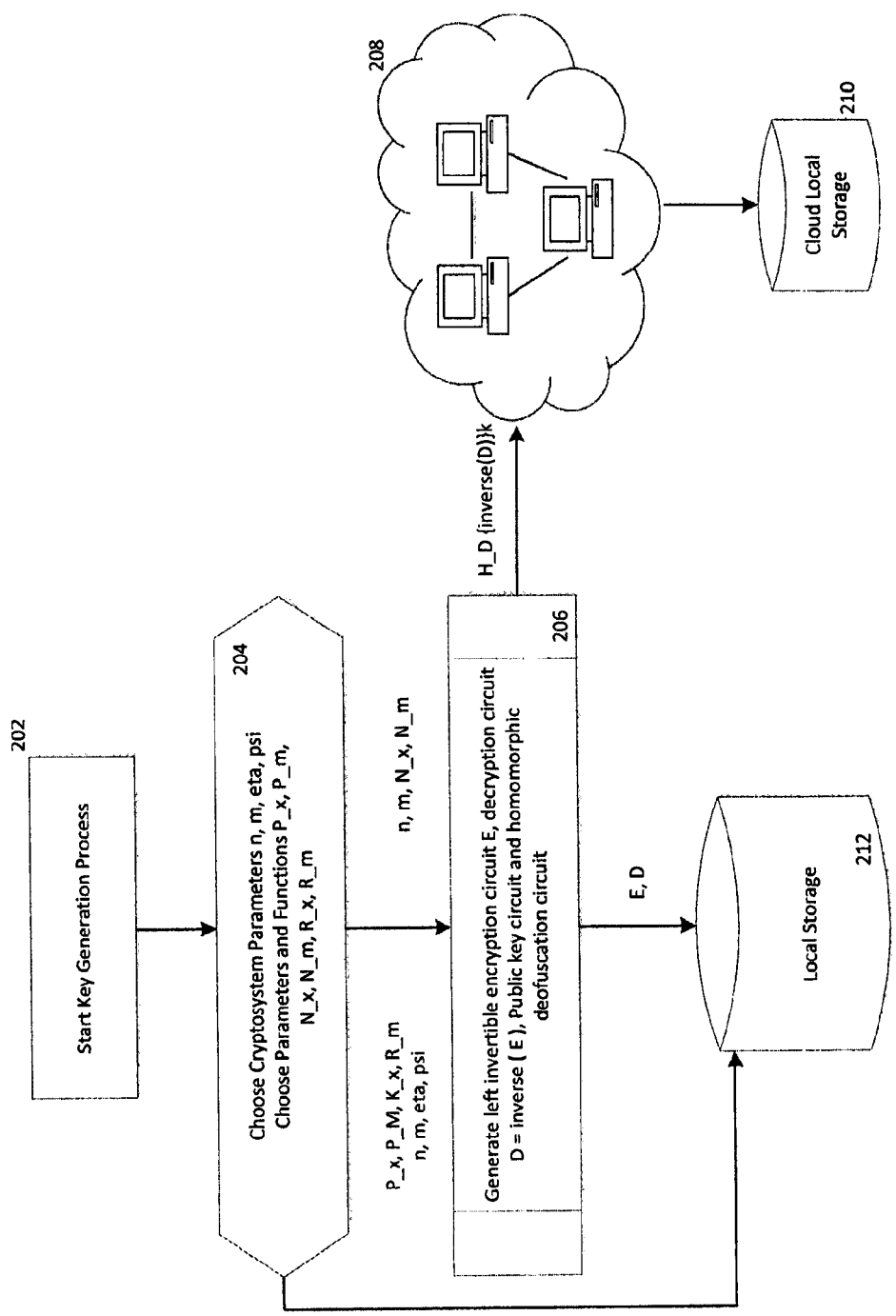
FIG. 2 is a functional diagram of a key generation process in a homomorphic encryption system that utilizes multivariate encryption polynomials, under an embodiment.

FIG. 2 is a functional diagram of a key generation process in a homomorphic encryption system that utilizes multivariate encryption polynomials, under an embodiment. As shown in FIG. 2, the process begins with the key generation step 202. The appropriate cryptosystem parameters (n, m, eta, psi) and functions (P_x, P_m, N_x, N_m, R_x, and R_m_ are selected 204. The P_x, P_m, R_x, R_m, n, m, eta, psi parameters are sent to local storage 212, while the n, m, N_x, and N_m parameters are processed in block 206 in which the left invertible encryption circuit E is generated. This process block also generates the decryption circuit D=Inverse(E), the public key circuit K=N_x(E(N_m(O(m))), and the homomorphic deobfuscation circuit H_D(inverse(O)). The encryption circuit E and the decryption circuit D are then sent to the local storage 212, while the deobfuscation circuit and public key circuit K are sent to the cloud 208, and passed on to cloud local storage 210.

Figure 3:
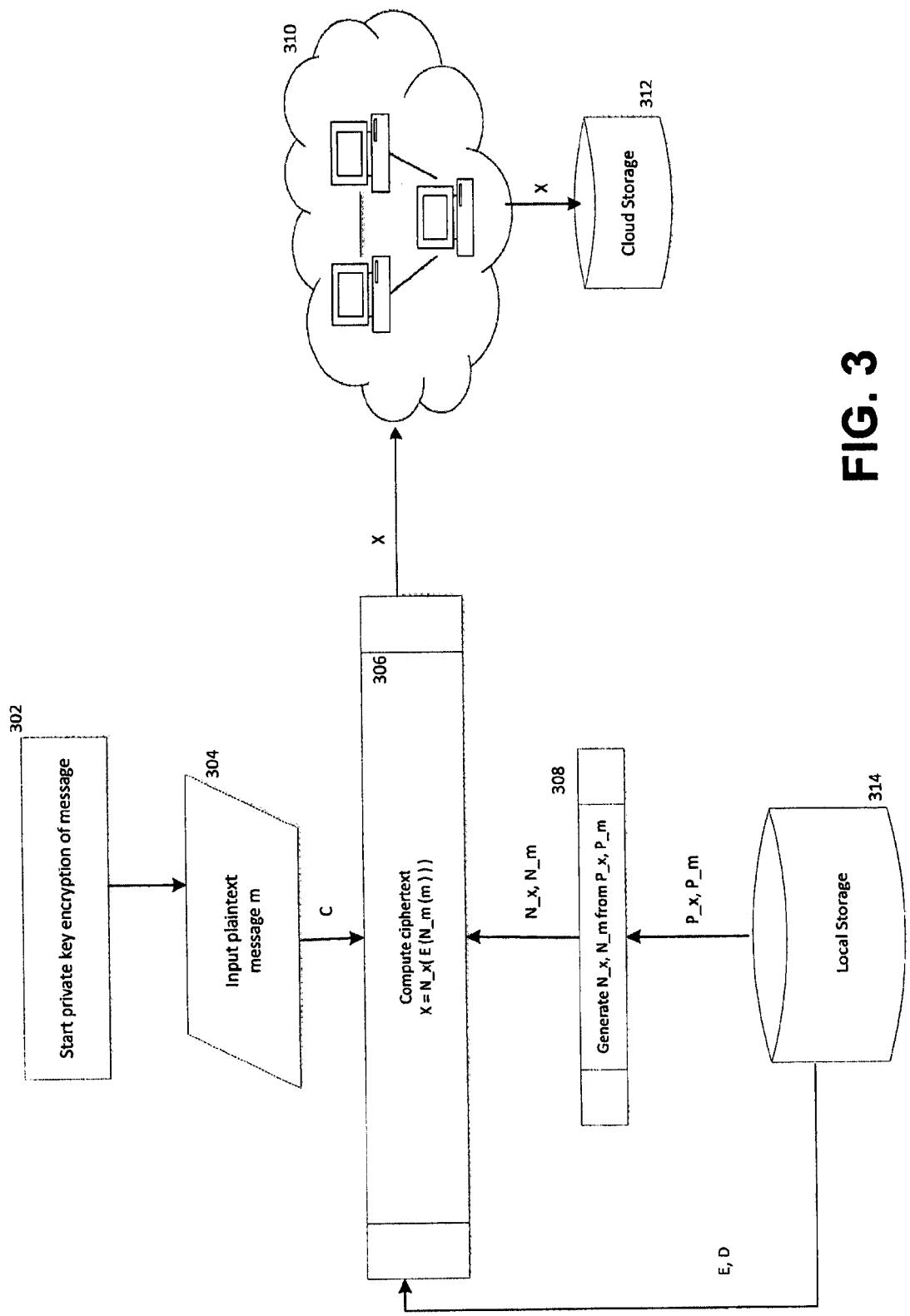
FIG. 3 is a functional diagram of a private key encryption process in a homomorphic encryption system that utilizes multivariate encryption polynomials, under an embodiment.

FIG. 3 is a functional diagram of a private key encryption process in a homomorphic encryption system that utilizes multivariate encryption polynomials, under an embodiment. The process of FIG. 3 begins with the initiation of private key encryption of the plaintext message, block 302. The plaintext message, m, is input to the encryption system, block 304. The encryption process then computes the ciphertext using the cipher C to generate x=N_x(E(N_m(m))), block 306. The ciphertext x is then transmitted to cloud 310 for storage in cloud storage 312. The local storage 314 provides the encryption E and decryption D circuits to block 306. The local storage 314 also provides the P_x and P_m functions that are used to generate N_x and N_m, block 308, which are then passed to block 306 for computation of the ciphertext x.

Figure 4:
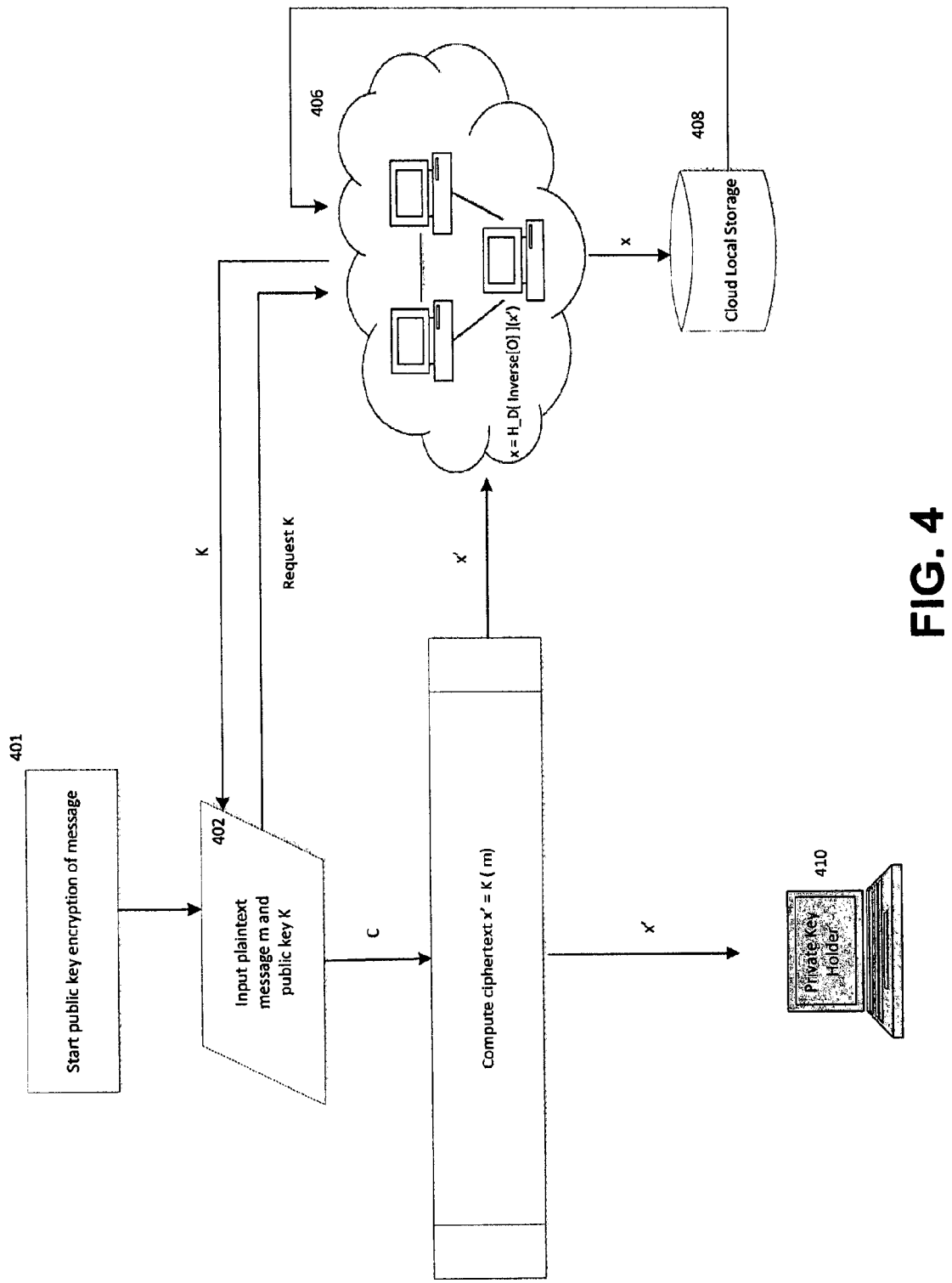
FIG. 4 is a functional diagram of a public key encryption process in a homomorphic encryption system that utilizes multivariate encryption polynomials, under an embodiment.

FIG. 4 is a functional diagram of a public key encryption process in a homomorphic encryption system that utilizes multivariate encryption polynomials, under an embodiment. The process of FIG. 4 begins with the initiation of public key encryption of the plaintext message, block 401. The plaintext message m and public key K are input to the encryption system, block 402. The public key is a published key that can be obtained from the cloud 406 after a public key request from the process. The encryption process then computes the ciphertext using the cipher C to generate x'=K(m), block 404. The ciphertext x' is then transmitted to cloud 406, which provides the ciphertext function x=H_D(inverse[O]](x') to generate the ciphertext x for storage in cloud storage 408. The ciphertext x' is then provided to a private key holder 410.

Homomorphic Circuit Derivation

Regarding the derivation homomorphic circuits, let $\mathcal{C}: \mathbb{Z}_2^n \to \mathbb{Z}_2^n$ be an arbitrary circuit on n input variables. The homomorphic equivalent $\mathcal{H}_\mathcal{D}$ is defined in terms of circuit composition as:

$$\mathcal{H}_\mathcal{D}[\mathcal{C}](x) = \mathcal{N}_x(\mathcal{E}(\mathcal{N}_m(\mathcal{C}(\mathcal{R}_m(\mathcal{D}(\mathcal{R}_x(x))))))) \quad (26)$$

Any circuit in $[\mathcal{E}]$ can be used in the equation above to generate a homomorphic circuit. The equation above represents taking first taking a function composition of some arbitrary circuit $\mathcal{C}$ and the decryption circuit, with noise removed, resulting in a circuit that would take ciphertexts as input and return the plaintext result of evaluating $\mathcal{C}$ on plaintext noise free $\mathcal{D}(x)$. Next that result is re-composed with some circuit from $[\mathcal{E}]$, plus noise giving the final circuit that can evaluate $\mathcal{C}$ on ciphertexts without the evaluator ever being able to see $\mathcal{D}$. It is worth noting that $\mathcal{R}_m(\mathcal{D}(\mathcal{R}_x(x)))$ is a left inverse of $\mathcal{N}_x(\mathcal{E}(\mathcal{N}_m(m))$, by circuit composition. Adding noise adds free dimensions, which essentially makes it easier to find an alternate encryption circuits in the same equivalence class, so that not every homomorphic circuit is using the 'same' encryption composition.

Figure 5:
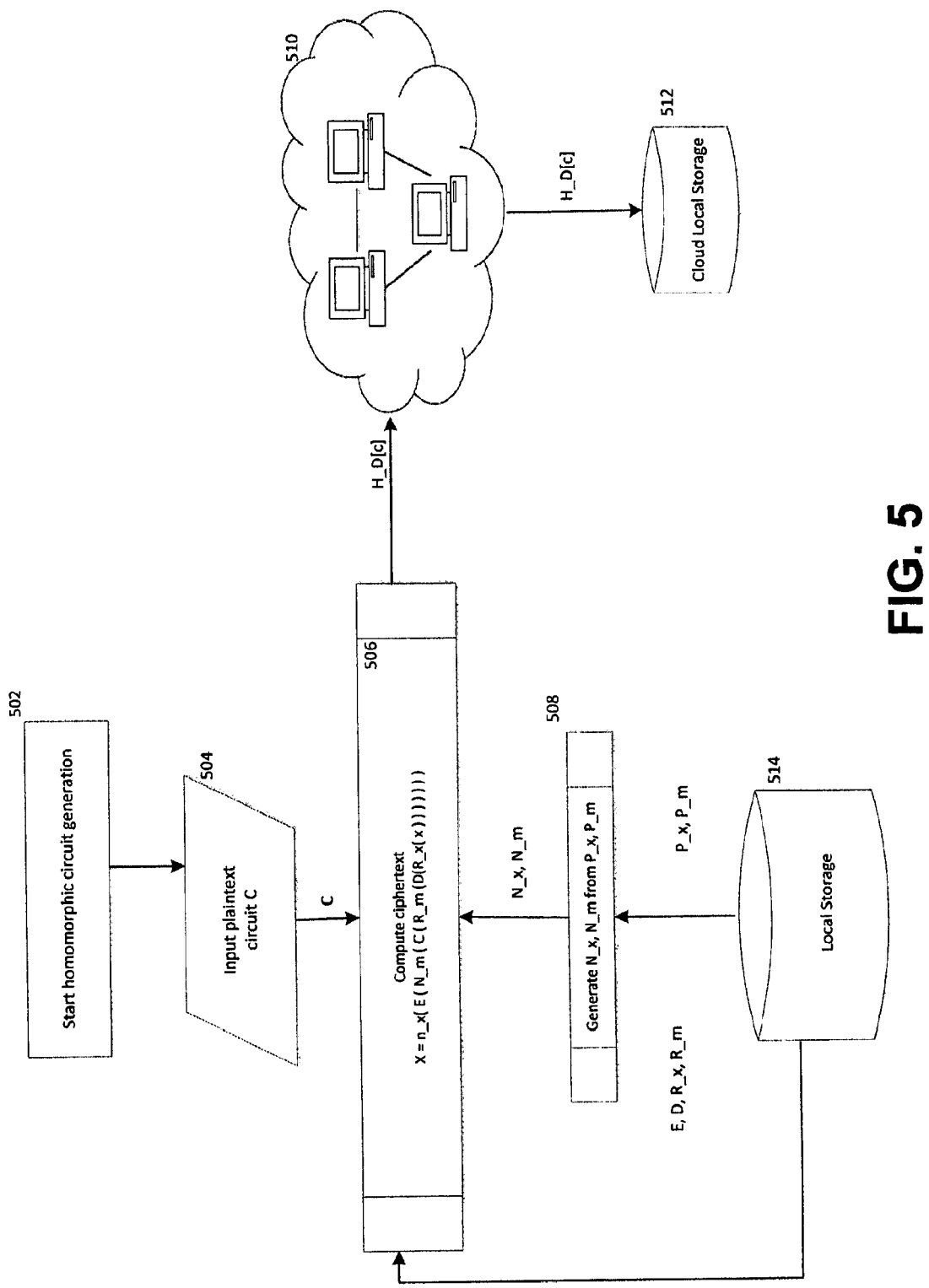
FIG. 5 is a functional diagram of a homomorphic circuit generation process in a homomorphic encryption system that utilizes multivariate encryption polynomials, under an embodiment.

FIG. 5 is a functional diagram of a homomorphic circuit generation process in a homomorphic encryption system that utilizes multivariate encryption polynomials, under an embodiment. As shown in FIG. 5, the process begins with the initiation of a homomorphic circuit generation step 502. The plaintext of circuit C is input to the system, block 504, and circuit C is passed to the ciphertext computation block 506. This block computes the ciphertext x=N_x(E(N_m(C(R_m(D(R_X)))))). The N_x and N_m functions are provided by block 508 which receives the parameters P_x and P_m from local storage 514. The local storage also provides the encryption and decryption circuits E, D, and the R_x and R_m functions to the computation block 506, which in turn passes the H_D[C] function to the cloud 510 for storage in cloud local storage 512.

Obfuscation

The left invertible obfuscation circuit $\mathcal{O}: \mathbb{Z}_2^m \to \mathbb{Z}_2^n$ serves to hide the encryption circuit $\mathcal{E}$ and allow for secure transmission of messages to the holder of the private key. A random subset of size n-n' of the output bits of $\mathcal{O}$ can be chosen to be random bits or functions as long as the function remains left invertible. This easily accomplished by first choosing a n' bit left invertible circuit on n' bits and then interweaving random numbers or functions as the other n-n' outputs. The decryption simply ignores the random portions of the circuit. This equivalent to what the noise and noise removal functions do during homomorphic circuit generation.

The induction key is the homomorphic deobfuscation circuit. That is, the induction key circuit consists of $\mathcal{H}_\mathcal{D}[\mathcal{O}^{-1}]: \mathbb{Z}_2^m \to \mathbb{Z}_2^m$. When constructing the homomorphic deobfuscation circuit, the last n' through η bits of $\mathcal{O}^-: \mathbb{Z}_2^m \to \mathbb{Z}_2^n$, should be defined as zero, but the bits η+1 through m should be random, if present. The construction of homomorphic circuits may be performed as described above. The holder of the private key provides the entity performing the work of evaluating the homomorphic circuits the induction key. It is unnecessary to store $\mathcal{O}$. If the evaluating entity ever loses the induction a new one can be chosen without the loss of any deobfuscated data. The obfuscation circuit makes recovering any part of $\mathcal{E}$ effectively impossible after ANF expansion of the composition of both circuits.

One consideration when choosing the obfuscation circuit is how much plaintext space the private key older wants to make available to third party encryption. Another consideration is the algebraic immunity and non-linearity of the circuit. If it was so desired the ANF polynomial for AES on some input, for a randomly chosen key, that is held private could be used. The size of such a circuit would most likely be very large, particularly with a large number of rounds, but it would be quite secure.

In an embodiment, the public key consists of the obfuscated encryption circuit $\mathcal{K}: \mathbb{Z}_2^m \to \mathbb{Z}_2^m$ and is defined as:

$$\mathcal{K}(m) = \mathcal{N}_x(\mathcal{E}(\mathcal{N}_m(\mathcal{O}(m)))) \quad (27)$$

The public key, in combination with the induction key can be used to generate homomorphic versions of arbitrary circuits. More than one public key can be produced and depending on the choices of obfuscation circuits and induction keys chosen, different dimensions circuits would be supported. The resulting dimension of the input supported by the public key will have to match the dimension of the output of the circuits whose homomorphic equivalents are generated.

The holder of the private key performs encryption by evaluating the circuit $\mathcal{E}$ on some plaintext input $m \in \mathbb{Z}_2^n$.

$$x = \mathcal{N}_x(\mathcal{E}(\mathcal{N}_m(m))) \quad (28)$$

The holder of the private key can, for increased security, find alternate usable ciphertext vectors by using a SAT solver to find a solution to $\mathcal{R}_m(\mathcal{D}(\mathcal{R}_x(x+\Delta x))) + \mathcal{R}_m\mathcal{D}(\mathcal{R}_x(x))) = 0$ to find alternate vectors that decrypt to the same value and can be used homomorphically.

A third party can encrypt using the obfuscated encryption function provided as part of the public key $\mathcal{K}$.

$$x' = \mathcal{K}(m) \quad (29)$$

Prior to being operated on the third party encrypted Boolean vector must be de-obfuscated with a homomorphic version of the inverse obfuscation circuit $\mathcal{H}_D[\mathcal{O}^-]$.

$$x = \mathcal{H}_D[\mathcal{O}^-](x') \quad (30)$$

The process of homomorphically deobfuscating the encrypted data is referred to as induction and would generally be performed by a third party who has been enlisted in doing the computation.

Decryption is performed by evaluating the decryption ($\mathcal{D}$) and noise removal circuits on a ciphertext $x \in \mathbb{Z}_2^m$ to recover the plaintext $m \in \mathbb{Z}_2^m$.

$$m = \mathcal{R}_m(\mathcal{D}(\mathcal{R}_x(x))) \quad (31)$$

Boolean Comparisons

The cryptosystem according to embodiments supports evaluating a Boolean comparison $f: \mathbb{Z}_2^n \times \mathbb{Z}_2^n \to \mathbb{Z}_2$, homomorphically, on two ciphertexts x, y∈$\mathbb{Z}_2^m$, assuming a circuit $\mathcal{C}$ (x, y) evaluating the Boolean comparison can be derived satisfying the following condition:

$$\mathcal{C}(x,y)_i = f(D(x), D(y)), \forall i \in \{1, 2, \ldots, m\} \quad (32)$$

If a circuit $\mathcal{C}$ (x, y) satisfying the above condition can be found, then the homomorphic equivalent of $f$ denoted by $\mathcal{H}_D[f]: \mathbb{Z}_2^m \times \mathbb{Z}_2^m \to \mathbb{Z}_2$ is defined as $$H_D[f](x,y) = \Pi_{i=1}^n \mathcal{C}(x,y)_i \quad (33)$$

In previous attempts at fully homomorphic cryptosystems, equality testing was not supported as it would render the cryptosystem insecure. Using the method described above, a homomorphic equivalent of an equality testing function is constructed: $f: \mathbb{Z}_2^n \times \mathbb{Z}_2^n \to \mathbb{Z}_2$. The process leverages the properties of addition in $\mathbb{Z}_2$ to construct a Boolean circuit $\mathcal{C}: \mathbb{Z}_2^m \times \mathbb{Z}_2^m \to \mathbb{Z}_2^m$ satisfying (32), which is then used to derive $\mathcal{H}_D[f]: \mathbb{Z}_2^m \times \mathbb{Z}_2^m \to \mathbb{Z}_2$ $$\mathcal{A}(x,y) = \mathcal{D}(x) + \mathcal{D}(y) \quad (34)$$

$$\mathcal{C}(x,y)_i = 1 + \Sigma_{j=1}^i \mathcal{A}_i(x,y) \quad (35)$$

$$g(x,y) = \Pi_{i=1}^n \mathcal{C}(x,y)_i \quad (36)$$

Two ciphertexts, x and y, represent the same plaintext value if g(x, y)=1. Unless g(x, y) can be factored exactly and then row reduced to determine $\mathcal{A}$ (x, y) the circuit $\mathcal{D}$ cannot be recovered. Boolean functions in 2m variables are not a unique factorization domain (although they are Noetherian). Furthermore, finding a set of factors for a Boolean function is hard problem, which if solvable in polynomial time would allow the inversion of arbitrary Boolean circuits in polynomial time. Finally, the set of satisfying assignments to g(x, y)=1 is also a hard problem and would only reveal the structure under that Boolean comparison. In this case, it would be possible (in exponential time) to determine the equivalence classes of bit equivalent plaintext vectors under $\mathcal{D}$, but it would require encrypting a large number of vectors and for each vector determining satisfying assignment to g(x, y) with one set of inputs fixed. Furthermore, this all assumes that an attacker knows what Boolean function is homomorphically supposed to be evaluated.

The Boolean comparators > and < can be similarly implemented. Embodiments use the fact that one can AND the XOR of two plaintexts, with each plaintext to determine the differing bits with respect to each. For the first set of computed difference, for each bit the process can AND the bit with the OR of the bits from the second set of computed elements bit up to the corresponding index. It should be noted that in certain circumstances these circuits should not be implemented in this fashion, as they might would allow someone to determine the value of a ciphertext in a logarithmic number encryptions, if an attacker figured out that is what operations the circuits were performing. The caveat is that in general, as even the evaluator does not know the individual circuits he or she is evaluating, it is possible to build homomorphic equivalent of the > and < comparators for the purposes of implementing homomorphic binary search. As long as an attacker does not figure out what operations the circuits are computing, the encryption mechanism is safe. However, a loop that does a comparison between two ciphertexts and repeatedly moves to halfway between two bounds in a homomorphic array based on the result is generally not hard to figure out.

In an embodiment, the cryptosystem allows the implementation of arbitrary algorithms and provides some flexibility as to how much logic is expressed homomorphically. For example, a binary search could be securely expressed as a circuit that does the comparison and index update homomorphically. That is given an array of homomorphically encrypted data and homomorphically encrypted control blob, the system can define a circuit that decrypts each entry in the array and the control blob, selects the appropriate element based on the index contained in the control blob, computes the half way point between the bounds (or returns 0 if it does not exist) and updates the bounds. This circuit in normal space is not that hard to define as indexing into an array is simply summing each element multiplied an expression that is only true if the index corresponds to that expression.

The example above is not intended to be fully illustrative of all possible algorithms. For one, it requires a fixed vector size for indexing to work properly. A preferred approach is to simply create a circuit that takes as input a homomorphically encrypted search term, the next element for comparison, and the current bounds and returns as output the next index. This hides the operation that is being done to determine the next index and avoids creating a circuitry that is unnecessary to replicate.

One advantage of this algorithm is that a designer can construct security preserving homomorphic circuits that are publicly usable by anyone. That is given some circuit $\mathcal{C}$, it is a hard problem to derive from its homomorphic equivalent $\mathcal{H}_D[\mathcal{C}]$.

As the neither the decryption circuit $\mathcal{D}$ nor the unobfuscated encryption circuit(s) [$\mathcal{E}$] are public, any sophisticated attempts at reversing the ciphertexts will require either a large number of ciphertexts to attempt frequency analysis on the ciphertexts or, if it exists, attempting to leverage the public key encryption circuit $\mathcal{K}$. The public encryption circuit $\mathcal{K}$ is merely injective into the ciphertext space $\mathbb{Z}_2^{m+\psi}$. It does not reveal any information about the size of the full plaintext space $\mathbb{Z}_2^n$. Even working under the assumption that the inverse of the circuit $\mathcal{K}$ can be derived the circuits [$\mathcal{E}$] and $\mathcal{O}$ are not separable without knowledge of $\mathcal{O}$. If $\mathcal{H}_D[\mathcal{O}^-]$, the homomorphic equivalent of $\mathcal{O}^-$ is acquired it can only be used to exhaustively search encryptions of the plaintext space supported by $\mathcal{K}$. In terms of timing and power consumption attacks, the homomorphic circuit generation process significantly smothers the differentiation in multiplication versus addition of plaintext, at those cost of slower computation.

Figure 6:
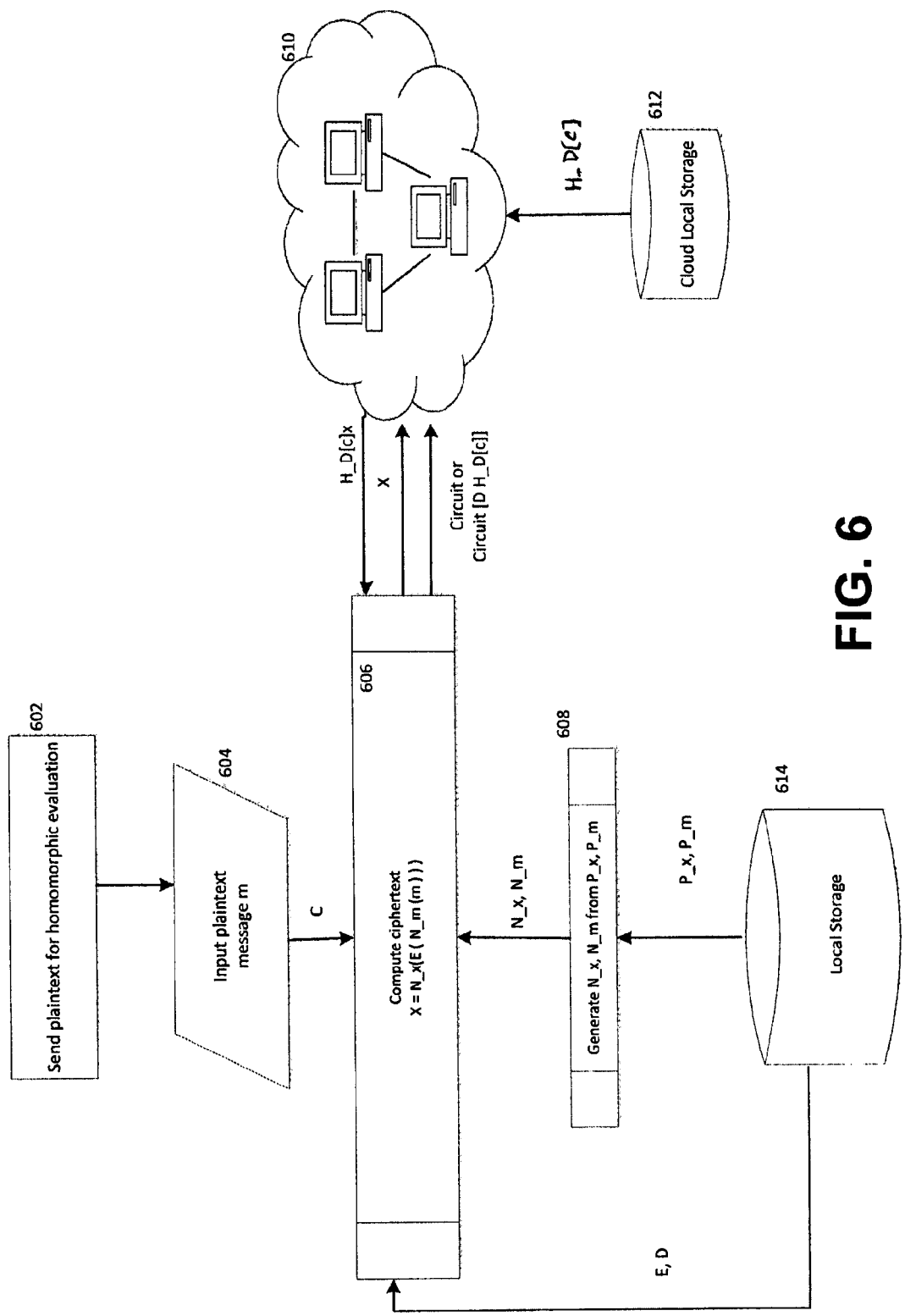
FIG. 6 is a functional diagram of homomorphic circuit evaluation on provided data, under an embodiment.

FIG. 6 is a functional diagram of homomorphic circuit evaluation on provided data, under an embodiment. As shown in FIG. 6, the process begins with the sending of plaintext for homomorphic evaluation, block 602. The plaintext input message m is input to the system 604. Block 606 computes the ciphertext x=N_x(E(N_m(m))). The N_x and N_m circuits are generated from the P_x and P_m parameters in block 608, wherein these parameters are provided from the local storage 614. The local storage also passes the encryption and decryption circuits E and D to block 606. This block passes the ciphertext x and circuit or circuit [D H_D[c]] to the cloud 610. In this embodiment, the H_D[C] function is provided through the cloud 610 from the cloud local storage 612 to the ciphertext computing block 606.

Figure 7:
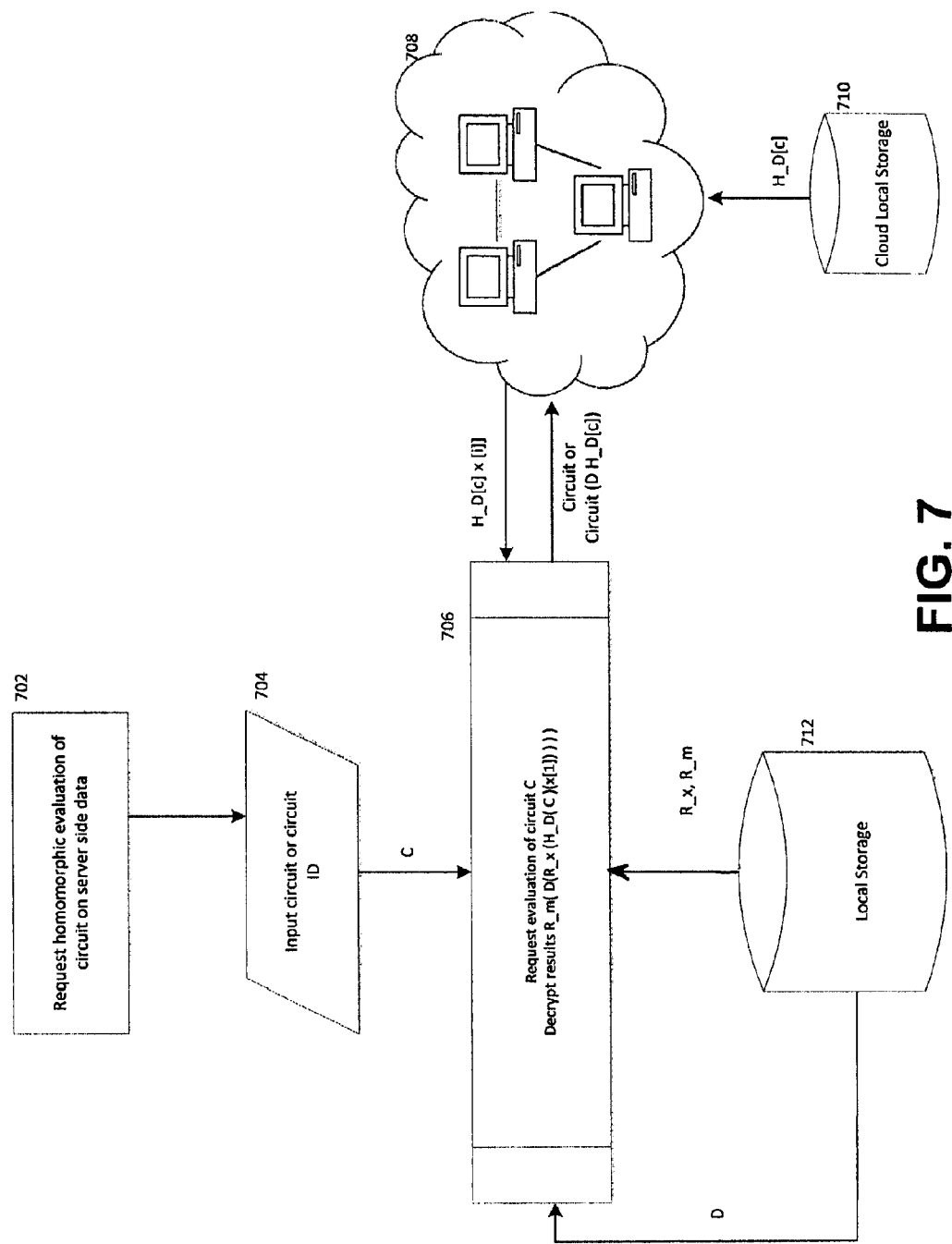
FIG. 7 is a functional diagram of homomorphic circuit evaluation on cloud data, under an embodiment.

FIG. 7 is a functional diagram of homomorphic circuit evaluation on cloud data, under an embodiment. As shown in FIG. 7, the process begins with the request for homomorphic evaluation of a circuit on server-side data, block 702. The input circuit or circuit ID is input to the system 704. Block 706 requests evaluation of the circuit C and sends the circuit or circuit ID to the cloud 708. The cloud local storage 710 returns the requested H_D[C] to the process block 706 through the cloud 708. This block then decrypts the results R_m(D(R_x(H_D[C]x[i]))). The R_x and R_m circuits and the decryption circuit D are provided from the local storage 714.

Multivariate Function Composition

In an embodiment, the homomorphic encryption system includes a multivariate function composition component. Multivariate function composition is used extensively in the key generation process. For illustrative purposes, an example of multivariate function composition of two multivariate circuits is provided.

$$\mathcal{F}: \mathbb{F}_2^n \to \mathbb{F}_2^m$$

$$\mathcal{F}_1: \mathbb{F}_2^n \to \mathbb{F}_2^{m'}$$

$$\mathcal{F}_2: \mathbb{F}_2^{m'} \to \mathbb{F}_2^m \quad (37)$$

$$\mathcal{F}(x) = \mathcal{F}_2(\mathcal{F}_1(x)) \quad (38)$$

The basic idea is to compute the polynomial representation of $\mathcal{F}(x) \in \mathbb{F}_2[x_1, x_2, \ldots, x_n]^m$ in terms of the polynomial input vector x by evaluating $\mathcal{F}_2$ on the result evaluating $\mathcal{F}_1$ on x. In order for two functions to be composable, the input dimensions of the outer functions must match the output dimension of the inner function. Composing a sequence of invertible functions $\{\mathcal{F}_i: 1 \le i \le k\}$, will results in an invertible function $\mathcal{F}: \mathbb{F}_2^n \to \mathbb{F}_2^m$, with inverse: $\mathcal{F}^{-1}(y) = \mathcal{F}_k^{-1}(\ldots \mathcal{F}_{k-1}^{-1}(\ldots \mathcal{F}_1^{-1}(y)\ldots))$, where $y \in \mathbb{F}_2[y_1, y_2, \ldots, y_m]^m$ and $y_i = y_i$. An example for n=3, n'=4, and m=3 is provided in Eqs. 9-11 above.

In an embodiment, key generation, encryption, and decryption is performed using a new class of multivariate cryptosystems that orthogonally embed polynomial functions used to generate less structured multivariate encryption polynomials. In general, previous attempts at designing secure multivariate cryptographic schemes have been broken by several attack strategies, such as Gröbner basis attacks, linearization and re-linearization, algebraic attacks, and exploitation of mathematical structure, among others.

Orthogonal embeddings avoid these issues by allowing encrypting entities to provide entropy during the encryption process at the cost of a fixed amount of ciphertext expansion. Resistance against prior attacks on multivariate cryptosystems and block ciphers in the security section is described immediately below.

First, the parameters used to generate the private key must be chosen. For practical reasons, such as word alignment on modern microprocessors these are generally fixed values such as 64, 128, or 256. Larger values are possible, but come with a significant performance penalty cost in both size of the public key and speed of execution, particularly for homomorphic operations, as even the simplest operations such as XOR scale quadratically with the bit length of the involved vectors. Even highly optimized implementation such as those using lookup tables for the monomial contributions become impractical as the tables no longer fit in the processor's cache. In this section, the following definitions apply: n—dimension of ciphertext space, m—dimension of plaintext space, v—dimension of input of multivariate trapdoor function The private key consists of three matrices and a vectorial multivariate polynomial function.

$$\mathcal{K}_{priv} = \{\mathcal{F} \in \mathbb{F}_2[x_1, x_2, \ldots, x_v]^m, \mathcal{E}_1 \in \mathbb{F}_2^{n \times m}, \mathcal{E}_2 \in \mathbb{F}_2^{n \times v}, D \in \mathbb{F}_2^{v \times n}\}$$

$$D\mathcal{E}_1 = 0^{v \times m}$$

$$D\mathcal{E}_2 \ne 0^{v \times v}, |D\mathcal{E}_2| = 1 \quad (39)$$

The constraints upon $\epsilon_1$ and $\epsilon_2$ allow the orthogonal embedding of the information necessary for decryption directly in the ciphertext and encryption circuit. The function $\mathcal{F}$ is a randomly chosen multivariate quadratic, with a limited number of terms for efficiency reasons. The only constraint during the generation of $\mathcal{F}$ process is that $\mathcal{N}[\overline{L}[\mathcal{F}]]$ be trivial. This means that the non-linear contribution of $\mathcal{F}$ will never be removed through straightforward Gaussian elimination, providing protection against subspace attacks. Finally, the matrix D is kept as part of the private key for convenience—as long as $\epsilon_1$ and $\epsilon_2$ are chosen to be orthogonal a suitable D could be recomputed at decryption time. For the purpose of describing our cryptosystem we will assume $D\epsilon_2 = I_v$, but it is trivial to use $(D\epsilon_2)^{-1}$ to calculate a new $D' = (D\epsilon_2)^{-1}D$ for use in the decryption step.

The public key is a multivariate system of equations derived from the private key and a randomly chosen injective vectorial multivariate function. For the purposes of describing how the public key is constructed, let $\mathcal{R}$ be a randomly chosen multivariate function and let t and r be polynomial vectors.

$$t \in \mathbb{F}_2[t_1, t_2, \ldots, t_m, r_1, r_2, \ldots, r_m]^m, t_i = t_i$$

$$r \in \mathbb{F}_2[t_1, t_2, \ldots, t_m, r_1, r_2, \ldots, r_m]^m, r_i = r_i \quad (40)$$

$$\mathcal{R}: \mathbb{F}_2^n \to \mathbb{F}_2^v$$

$$\mathcal{R} \in \mathbb{F}_2[t_1, t_2, \ldots, t_m, r_1, r_2, \ldots, r_m]^v \quad (41)$$

As $\mathcal{R}$ will be composed with $\mathcal{F}$, $|\{v: v \in \mathcal{F}(\mathcal{R}(t, r))\}|$ should be chosen such that is efficiently computable, but still remains secure. Under current computing resources $2^{16}$ unique monomials and $\deg \mathcal{F}(\mathcal{R}(t, r)) = 4$, are generally sufficient. A public key is constructed as follows:

$$\mathcal{K}_{pub}: \mathbb{F}_2^n \to \mathbb{F}_2^n$$

$$\mathcal{K}_{pub} \in \mathbb{F}_2[t_1, t_2, \ldots, t_m, r_1, r_2, \ldots, r_m]^n$$

$$\mathcal{K}_{pub} = \mathcal{E}_1(t + \mathcal{F}(\mathcal{R}(t,r))) + \mathcal{E}_2 \mathcal{R}(t,r) \quad (42)$$

In an example, Bob wishes to send a message to Alice. He looks up Alice's public key, $\mathcal{K}$ pub, and uses it to encrypt messages by evaluating the public key and providing a random source of bits equal to the length of the private key. For each block in the message $t_i$, Bob would generate a random vector $r_i$ and compute $x_i \in \mathbb{F}_2^n$.

$$x_i = \mathcal{K}_{pub}(t_i, r_i) \quad (43)$$

The ciphertext $x_i$ can then be securely transmitted to Alice over an insecure channel. The original message can be decrypted using a private key.

$$\mathcal{D}(x_i) = \varepsilon_1^+(x_i + \varepsilon_2 D x_i) + \mathcal{F}(D x_i) \quad (44)$$

$$= \varepsilon_1^+ \varepsilon_1(t_i + \mathcal{F}(\mathcal{R}(t_i, r))) + \mathcal{F}(\mathcal{R}(t, r))$$

$$= t_i + \mathcal{F}(\mathcal{R}(t_i, r)) + \mathcal{F}(\mathcal{R}(t_i, r))$$

$$= t_i$$

In addition to the matrix D that recovers the right side ($\epsilon_2$) of the orthogonal embedding, there is another matrix L that recovers the left side ($\epsilon_1$) of the matrix. The existence of L is guaranteed by the existence of D, from which it can be computed directly.

$$L = \varepsilon_1^+(I + \varepsilon_2 D) \quad (45)$$

$$Lx = \varepsilon_1^+(I + \varepsilon_2 D)x$$

$$= t + \mathcal{F}(\mathcal{R}(t, r))$$

Certain modifications may be implemented. For example, if $\mathcal{R}$ is chosen to be bijective and only relies on the plaintext, plaintext expansion can be avoided. The trade-off here is that Gröbner basis algorithms are more effective against system of equations with a unique solution than those with multiple solutions. In addition, the scheme reverts to only being IND-CPA secure as there are not multiple ciphertext representations of each plaintext. Another possible modification is the ciphertext/plaintext ratio. Currently, there is 2:1 ratio, but this ratio can be increased or decreased to 1:1. In order to go below a 2:1 ratio either the parameters m and n have to change or the $\mathcal{R}$ must be bijective or least allow for partial recovery of bits. All these changes can affect the security of the algorithm and what it boils down is that as long as an orthogonal system is created that allows a holder of the private key to extract the necessary bits, it maybe possible to construct a secure instance of the cryptosystem for a particular purpose. In fact, one can imagine a cryptosystem based on the discrete wavelet transform (using either Walsh or Haar wavelets).

The underlying trapdoor is the nondeterministic polynomial time complete (NP-complete) problem of inverting systems of arbitrary multivariate equations. Although, at first glance this cryptosystem resembles a stream cipher, it does not require create or require a reconstructible stream of high entropy bits. While the described scheme could probably bootstrapped into a stream cipher using AES in counter mode or some suitable reconstructible stream of cryptographically strong pseudo random numbers, the orthogonal embedding allows the construction random multivariate equations that operate on independent blocks. As computing the inverse of a random multivariate system of equations is a known NP-complete problem, this block cipher can be used asymmetrically, without giving up any security, but at the cost of some ciphertext expansion.

Constructing Homomorphic Operations

In an embodiment, the system uses a multivariate system of equations representing any desired operation using known algebraic representations of the encryption and decryption schemes to construct fully homomorphic operations. Embodiments also include certain optimization procedures that can be performed instead of doing the expensive operation of function composition. Let $x_i \in \mathbb{F}_2[x_1, x_2, \ldots, x_n]^n$, $1 \le i \le k$, be vectors of linear monomials and ciphertexts, with $x_{i,j} \in \mathbb{F}_2[x_1, x_2, \ldots, x_n]$ a linear monomial representing the jth bit in linear polynomial vector $x_i$. The algebraic representation decryption in terms of linear ciphertext monomials can be used to construct any arbitrary k-ary operation $g(x_1, x_2, \ldots, x_k)$ in terms of ciphertext monomials.

$$\mathcal{K}_{pub}(g(\mathcal{D}(x_1), \mathcal{D}(x_2), \ldots \mathcal{D}(x_k)) \quad (46)$$

The above definition of fully homomorphic encryption is correct by construction. The decryption circuit expresses each corresponding plaintext in terms of the ciphertext and any k-ary operation can be constructed via multivariate polynomial function composition. While this provides a general constructive approach for fully homomorphic encryption, it is impractical in general, as any algebraically complex g would quickly become infeasible to represent as a system of multivariate polynomials. One embodiment involves constructing a set of homomorphic operations that enable third parties to evaluate arbitrary boolean circuits on ciphertexts by combining various functions together. The description below includes examples of some basic functional encryption by providing a way of securely evaluating equality of two ciphertexts, without decrypting them.

With regard to basic instructions, the operators XOR & AND form a functionally complete set of Boolean operators, with negation being represented as XOR by a non-zero constant. This allows a limited set of instructions to represent any computable Boolean circuit as follows:

1. XOR (+)—Bitwise XOR, defined addition over $\mathbb{F}_2^n$.
2. AND (×)—Bitwise AND, defined as the hadamard product of two vectors over $\mathbb{F}_2^n$.
3. MMULT—Matrix multiplications can permute, select, shift (<<, >>) or represent an arbitrary linear transformation of a vector.
4. EQUALS—This is a circuit that can compare two vectors to determine if they represent the same value.

Combining these instructions yields the following constructions for XOR, AND, MMULT, and EQUALS. With regard to XOR, there are two forms of the XOR instruction. The binary operator version is defined in term of two input polynomial vectors $x \in \mathbb{F}_2[x_1, x_2, \ldots, x_n]^m$ and $y \in \mathbb{F}_2[y_1, y_2, \ldots, y_n]^m$ with $x_i = x_i$ and $y_i = y_i$.

XOR: $\mathbb{F}_2^m \times \mathbb{F}_2^m \to \mathbb{F}_2^m$

XOR$\in \mathbb{F}_2[x_1, x_2, \ldots, x_n, y_1, y_2, \ldots, y_n]$ $$\text{XOR}(x,y) = x+y \quad (47)$$

The unary operation version is defined in terms of an input polynomial vector $x \in \mathbb{F}_2[x_1, x_2, \ldots, x_n]^m$. This input vector is treated as if it is the lower half and upper half are the inputs to the binary version of the operator.

$$XOR(x) = XOR\left(I\left[n; 1, \frac{n}{2}\right]x, I\left[n; \frac{n}{2}+1, n\right]x\right) \quad (48)$$

With regard to AND, there are two forms of the AND instruction. The binary operation is defined in term of two input polynomial vectors $x \in \mathbb{F}_2[x_1, x_2, \ldots, x_n]^m$ and $y \in \mathbb{F}_2[y_1, y_2, \ldots, y_n]^m$ with $x_i = x_i$ and $y_i = y_i$.

AND: $\mathbb{F}_2^m \times \mathbb{F}_2^m \to \mathbb{F}_2^m$

AND$\in \mathbb{F}_2[x_1, x_2, \ldots, x_n, y_1, y_2, \ldots, y_n]$ $$\text{AND}(x,y) = x \circ y \quad (49)$$

The unary version is defined in the same way as XOR.

$$AND(x) = AND\left(I\left[n; 1, \frac{n}{2}\right]x, I\left[n; \frac{n}{2}+1, n\right]x\right) \quad (50)$$

The matrix multiply instruction (MMULT) is defined in terms of matrix multiplication of a polynomial vector $x_i \in \mathbb{F}_2[x_1, x_2, \ldots, x_n]^m$ with $x_i = x_i$, by a matrix $M \in \mathbb{F}_2^{r \times m}$. Any linear transformation of x can be computed using this instruction, but the most common thing will be multiplication by square matrices where r=m.

$$\text{MMULT}(x) = Mx \quad (51)$$

The EQUALS instruction has two versions just like AND and XOR. The binary version is the evaluation of the statement XOR(x, y)=0 and the unary version is the evaluation of the statement XOR(x)=0.

With regard to complementing any Boolean Circuit, let $\mathcal{F} \in \mathbb{F}_2[x_1, x_2, \ldots, x_n]^m$ be the vectorial ANF representation of an arbitrary Boolean circuit. Every monomial $t \in \mathcal{F}_i$ can be constructed using repeated PERMUTE, SELECT, AND, and XOR instructions. For example, let $\mathcal{F} \in \mathbb{F}_2[x_1, x_2, x_3, x_4, x_5]^5$ with $\mathcal{F}(x)_i = x_1 + x_2 + x_1 x_3 + x_2 x_3 x_5$ and $x_i = x_i$.

$$\mathcal{F}(x)_i = \begin{bmatrix} 1 & 0 & 0 & 0 & 0 \\ 0 & 1 & 0 & 0 & 0 \\ 0 & 0 & 0 & 0 & 0 \\ 0 & 0 & 0 & 0 & 0 \\ 0 & 0 & 0 & 0 & 0 \end{bmatrix} x + \begin{bmatrix} 1 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad (52)$$

$$(\text{AND}(x, x \gg 3) + \text{AND}(x \gg 1, x \gg 3, x \gg 5)$$

Constructing Homomorphic Circuits

Embodiments of the multivariate polynomial scheme described above can be used to construct homomorphic circuits XOR and AND. In this case, $\mathcal{F} \in \mathbb{F}_2[x_1, x_2, \ldots, x_n]^m$ XOR is the simplest circuit and it can be constructed entirely using linear operations.

$$\begin{aligned}\mathcal{H}[+](x, y) &= \mathcal{K}\text{pub}(\mathcal{D}(x) + \mathcal{D}(y), Dx + Dy) \\ &= \varepsilon_1(\mathcal{D}(x) + \mathcal{D}(y) + \mathcal{F}(Dx + Dy)) + \varepsilon_2(Dx + Dy) \\ &= x + y + \varepsilon_1(\mathcal{F}(Dx + Dy) + \mathcal{F}(Dx) + \mathcal{F}(Dy))\end{aligned} \quad (53)$$

As previously mentioned, there is an inline version for XORing the low and high half of the corresponding plain-text. The main difference from the unary version is that we generate a random matrix $R \in \mathbb{F}_2^{m \times m}$ with $|R|=1$.

$$XOR(x) = XOR\left(I\left[n; 1, \frac{n}{2}\right]x, I\left[n; \frac{n}{2}+1, n\right]x\right) \quad (54)$$

$$\mathcal{H}[+](x) = \mathcal{K}\text{pub}\left(\left(I\left[n; 1, \frac{n}{2}\right] + I\left[n; 1, \frac{n}{2}\right]\right)\mathcal{D}(x), RDx\right)$$

The AND circuit is generally simple to construct, but tends to result in very large systems of equations as follows:

$$\mathcal{H}[\times](x,y) = \mathcal{K}\text{pub}(\mathcal{E}_1^+(x + \mathcal{F}(Dx)) \circ (\mathcal{E}_1^+(y + \mathcal{F}(Dy)), Rx) \quad (55)$$

The MMULT circuit is simple to construct and computational costs are on the same order as XOR.

$$\mathcal{H}[\text{MMULT}](M,x) = \mathcal{K}\text{pub}(M\mathcal{D}(x), RDx) \quad (56)$$

Embodiments include a system that can encrypt and process multiple data sets. In such a system, the method is configured to encrypt a first plaintext data set to generate a first ciphertext, encrypt a second plaintext data set to generate a second ciphertext, and compare the first and second ciphertexts to determine equivalence between the ciphertexts. The system can also determine whether a numerical representation of the first ciphertext is greater than or less than the second ciphertext. The method can also perform a function, such as a binary search, sorting, and hashtable generation over multiple ciphertext blocks of at least one of the first ciphertext and the second ciphertext; it can also represent null terminated string and common string operations.

Embodiments described herein provide an efficient fully homomorphic cryptosystem capable of evaluating arbitrary circuits. This cryptosystem supports efficient for encryption, decryption, and homomorphic evaluation of provided circuits for arbitrary circuits. In addition, this cryptosystem supports evaluation of comparative Boolean functions allowing for implementation of primitive logic control.

Aspects of the one or more embodiments described herein may be implemented in a computer system that processes data in a network that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Aspects of the systems described herein may be implemented in an appropriate computer-based sound network environment for processing data. Portions of the homomorphic encryption system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of performing fully homomorphic encryption on a data set, comprising:

providing a multivariate encryption polynomial to encrypt the data set and produce an encrypted data set;

providing a multivariate decryption polynomial to decrypt the encrypted data set;

providing a vectorial multivariate function polynomial that represents an operation to be performed on the encrypted data set; and distributing the multivariate function polynomial and the multivariate encryption polynomial to a user, wherein the fully homomorphic encryption is performed based on orthogonal embeddings and based on a nondeterministic polynomial time complete (NP-complete) problem, and wherein the multivariate function polynomial and the multivariate encryption polynomial are algebraic equations and the multivariate function polynomial represents a Boolean circuit.

2. The method of claim 1 wherein the fully homomorphic encryption is performed in a public-key/private-key encryption system, and wherein the multivariate function polynomial comprises a ciphertext representation of the data set.

3. The method of claim 1 further comprising:
distributing the multivariate decryption polynomial to the user privately.

4. The method of claim 1 wherein the Boolean circuit comprises a left inverse function.

5. The method of claim 2 wherein the multivariate decryption polynomial comprises a private key consisting of a plurality of matrices and a vectorial multivariate polynomial function, and wherein the multivariate encryption polynomial comprises a public key derived from the private key and a randomly selected injective vectorial multivariate function.

6. The method of claim 5 further comprising orthogonally embedding information required for decryption in the ciphertext and the multivariate encryption polynomial.

7. The method of claim 6 wherein the injective vectorial multivariate equation comprises a randomly chosen multivariate quadratic function, and wherein a nullspace of the quadratic function is trivial.

8. The method of claim 2 wherein the ciphertext comprises noised ciphertext space, the method further comprising:
adding noise to the data set, the noise comprising randomly selected plaintext noise and ciphertext noise; and
removing the noise from the data set by mapping data set values to a lower dimensional space.

9. The method of claim 3 further comprising providing an obfuscation function that hides parameters of an encryption function generating the encrypted data, the obfuscation function selecting random bits of an output set comprising the encrypted data set, and wherein the random bits are ignored by a decryption function decrypting the encrypted data.

10. A method of performing fully homomorphic encryption on a data set, comprising:
providing a public multivariate encryption polynomial to encrypt the data set and produce an encrypted data set;
providing a private multivariate decryption polynomial to decrypt the encrypted data set;
providing a vectorial multivariate function polynomial that represents an operation to be performed on the encrypted data set; and
distributing the multivariate function polynomial to a user publicly, wherein the fully homomorphic encryption is performed based on orthogonal embeddings and based on a nondeterministic polynomial time complete (NP-complete) problem, and wherein the multivariate function polynomial and the multivariate encryption polynomial are algebraic equations and the multivariate function polynomial represents a Boolean circuit.

11. The method of claim 10 wherein the private decryption key comprises a plurality of matrices and a vectorial multivariate polynomial function.

12. The method of claim 11 wherein the public encryption key is derived from the private decryption key and a randomly selected injective vectorial multivariate function.

13. The method of claim 12 wherein the selected injective vectorial multivariate function comprises orthogonally embedding information required for decryption of the data set.

14. The method of claim 13 wherein the injective vectorial multivariate equation comprises a randomly chosen multivariate quadratic function, and wherein a nullspace of the quadratic function is trivial.

15. A method of performing fully homomorphic encryption on a data set, comprising:
providing a public multivariate encryption polynomial to encrypt the data set and produce an encrypted data set;
providing a private multivariate decryption polynomial to decrypt the encrypted data set; and
providing multiple vectorial function polynomials that represent a functionally complete set of operations to be performed on the encrypted data set; and
distributing the multiple vectorial function polynomials to a user publicly, wherein the fully homomorphic encryption is performed based on orthogonal embeddings and based on a nondeterministic polynomial time complete (NP-complete) problem, and wherein the public multivariate encryption polynomial and the private multivariate decryption polynomial are algebraic equations and the multiple vectorial multivariate function polynomials represent a functionally complete set of operators that are chained together to create a Boolean circuit.

16. The method of claim 15 further comprising representing null terminated string and common string operations.

17. The method of claim 15 further comprising:
encrypting a first plaintext data set to generate a first ciphertext;
encrypting a second plaintext data set to generate a second ciphertext; and comparing the first and second ciphertexts to determine equivalence.

18. The method of claim 15 further comprising determining whether a numerical representation of the first ciphertext is greater than or less than the second ciphertext.

19. The method of claim 18 further comprising performing at least one of binary search, sorting, and hashtable generation over multiple ciphertext blocks of at least one of the first ciphertext and the second ciphertext.

* * * * *